United States Patent [19]

Ching

[11] Patent Number: 5,169,042
[45] Date of Patent: Dec. 8, 1992

[54] BICYCLE CARRYING RACK

[76] Inventor: Bryant Y. Ching, 14565 Runnymede St., Van Nuys, Calif. 91405

[21] Appl. No.: 700,198
[22] PCT Filed: Oct. 10, 1989
[86] PCT No.: PCT/US89/04376
§ 371 Date: May 31, 1991
§ 102(e) Date: May 31, 1991
[51] Int. Cl.⁵ .......................... B60R 7/00; B60R 9/00
[52] U.S. Cl. .................. 224/42.45 R; 224/42.03 R; 224/42.03 B
[58] Field of Search ............... 224/42.03 B, 42.03 R, 224/42.07, 42.08, 42.45 R

[56] References Cited

U.S. PATENT DOCUMENTS

| | | | |
|---|---|---|---|
| 3,794,227 | 2/1974 | Stearns | 224/42.01 |
| 4,352,363 | 10/1982 | Wilson | 135/7 |
| 4,640,658 | 2/1987 | Webb, Jr. | 414/462 |
| 4,676,413 | 6/1987 | Began et al. | 224/42.07 |
| 4,676,414 | 6/1987 | Deguevara | 224/42.03 R |
| 4,726,499 | 2/1988 | Hoerner | 224/314 |
| 4,856,686 | 8/1989 | Workentine | 224/42.07 |
| 5,004,133 | 4/1991 | Wyers | 224/42.03 B |

Primary Examiner—Henry J. Recla
Assistant Examiner—David J. Walczak

[57] ABSTRACT

A rack for carrying bicycles on the rear of a motor vehicle equipped with a trailer hitch which has an "L" shaped mounting leg (20) with a horizontal member (24) that slides into a draw bar of a class 3 trailer hitch. A rotatable beam (36) is disposed within a hole in the mounting leg and a pair of arms (44) are removably fixed one near each end. The arms are in U-shape and are made in two parts removable by a slip joint (48). The arms hold the bicycles therebetween onto the frames and one of the sections of each arm is removable allowing the arm to be locked around the bicycle frame. Padlocks (34) or pins (32) and (42) with spring clips lock the rack in place and the bicycles onto the rack. A second embodiment attaches to a class 1 or 2 trailer hitch and is identical, except the "L" shaped mounting leg is replaced by a vertical column (62) and a stud (66) interfaces with the hitch.

13 Claims, 3 Drawing Sheets

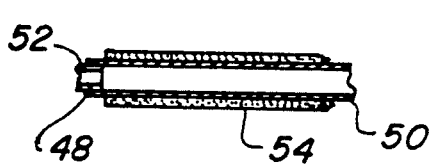
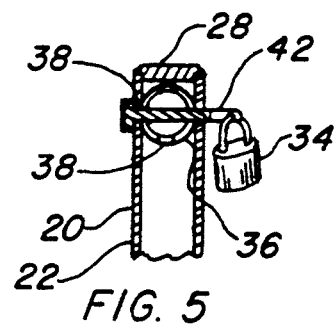
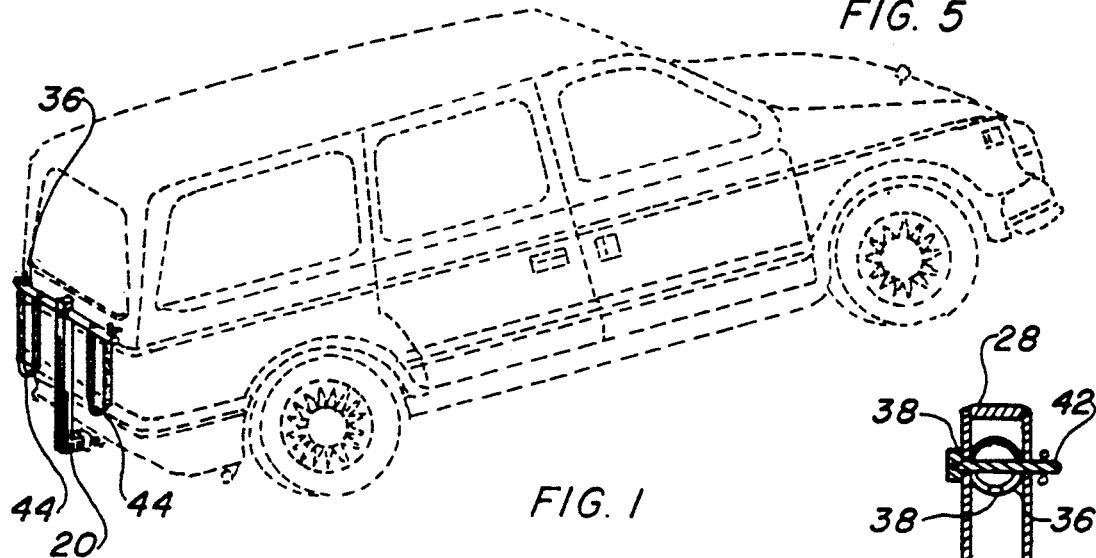
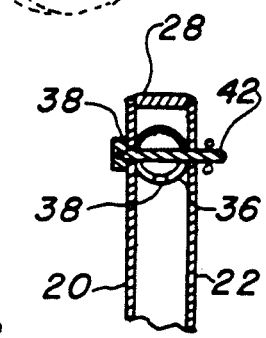
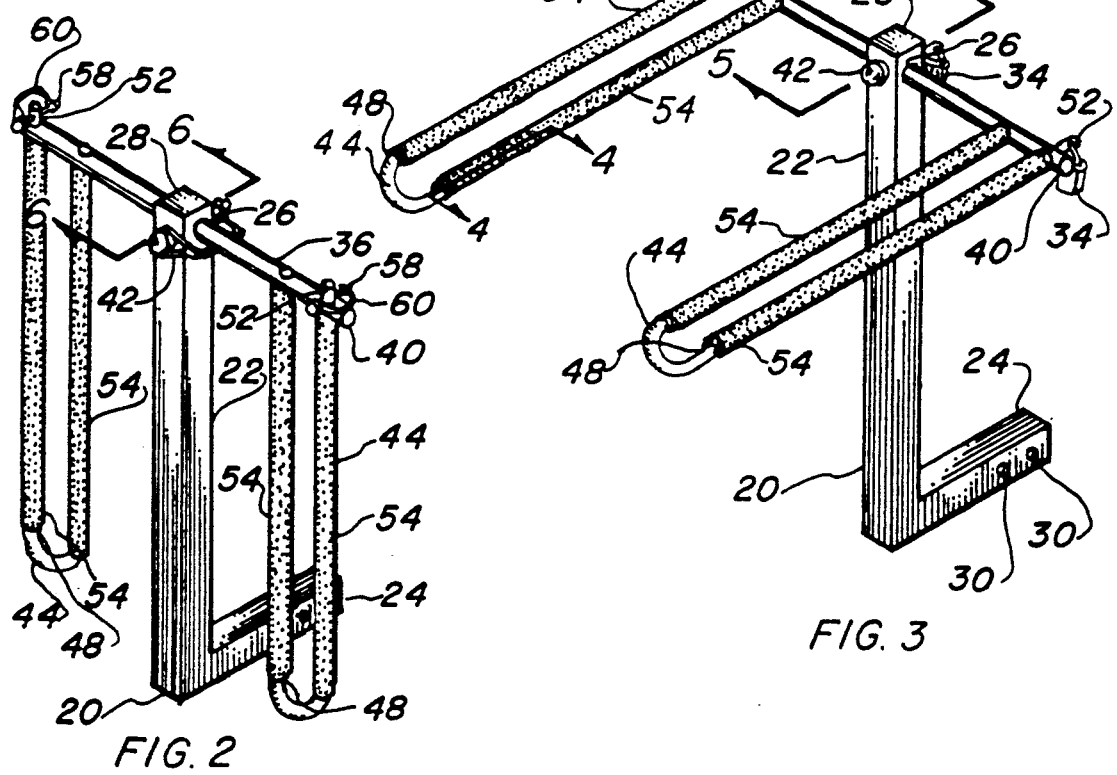

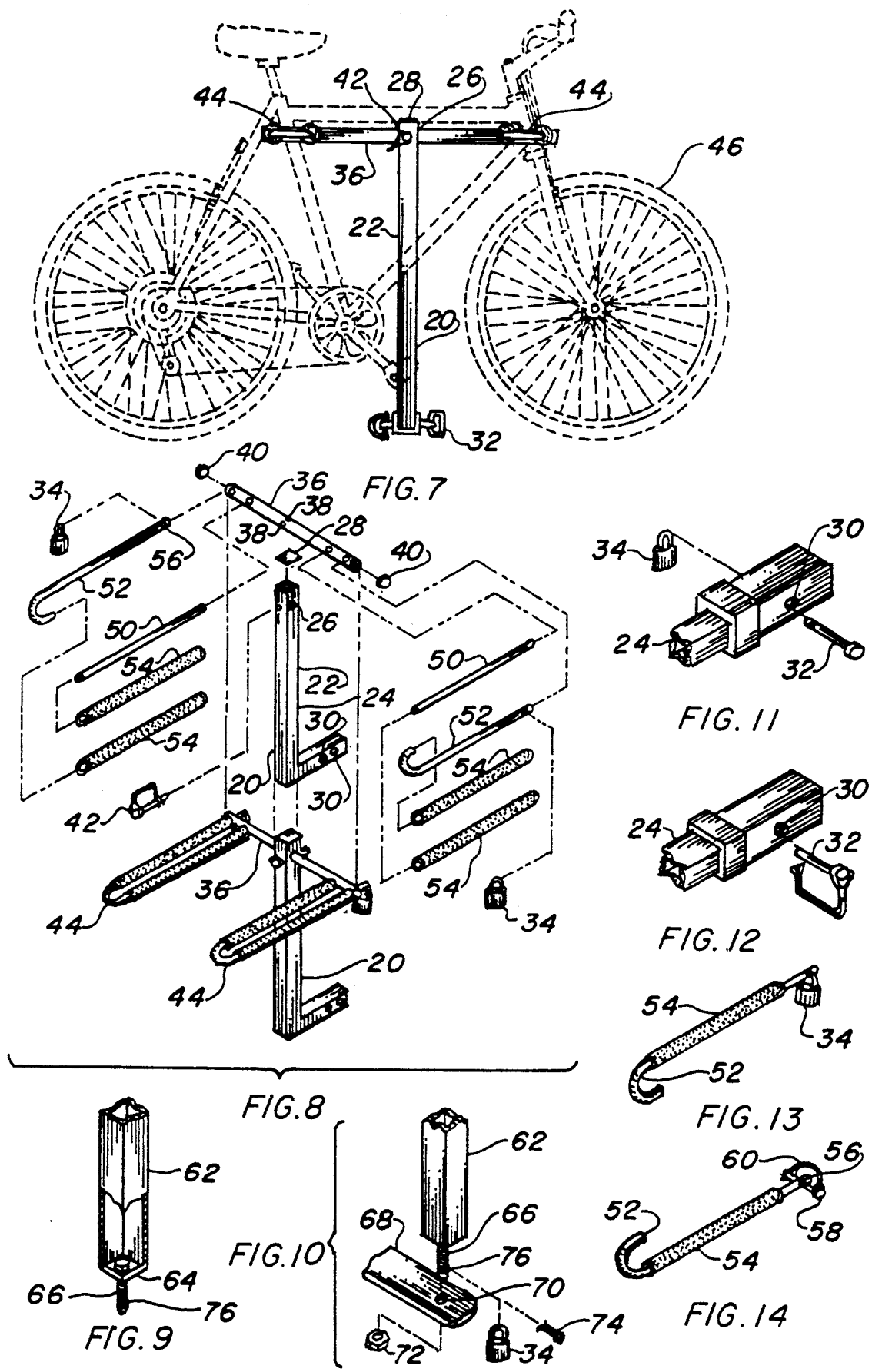

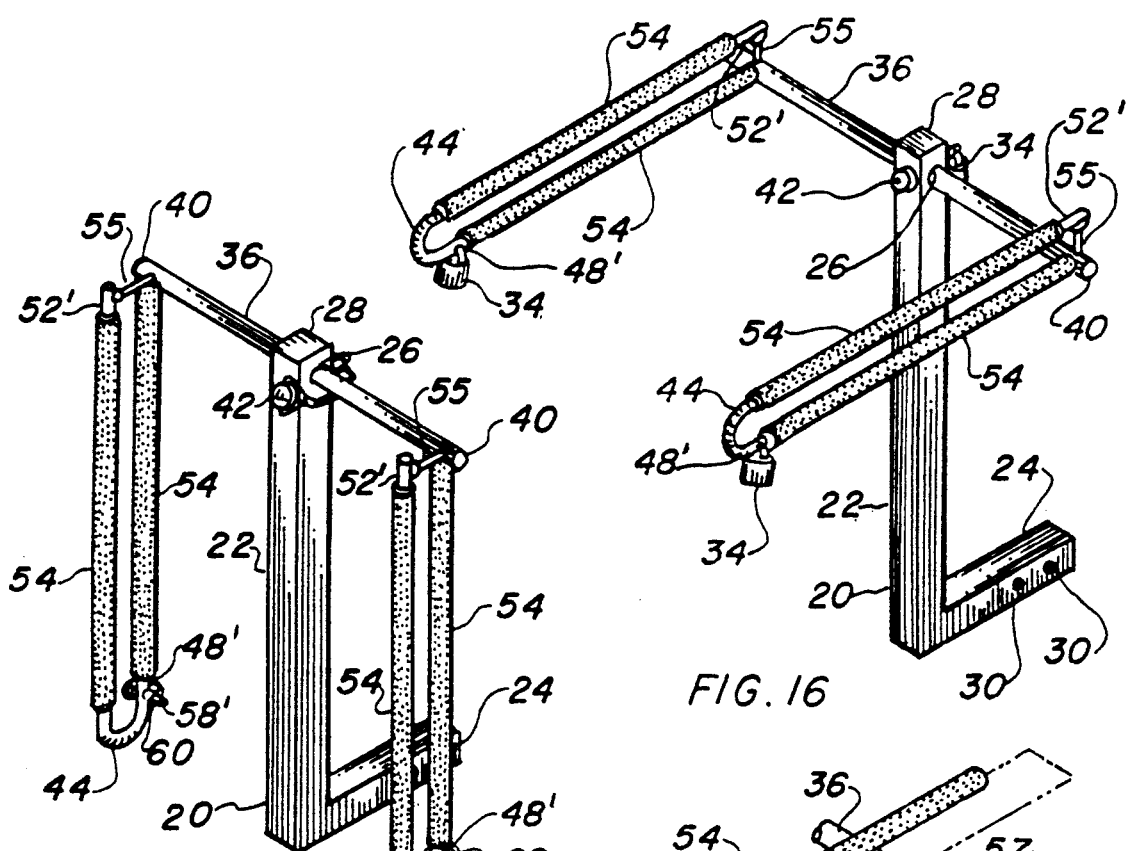
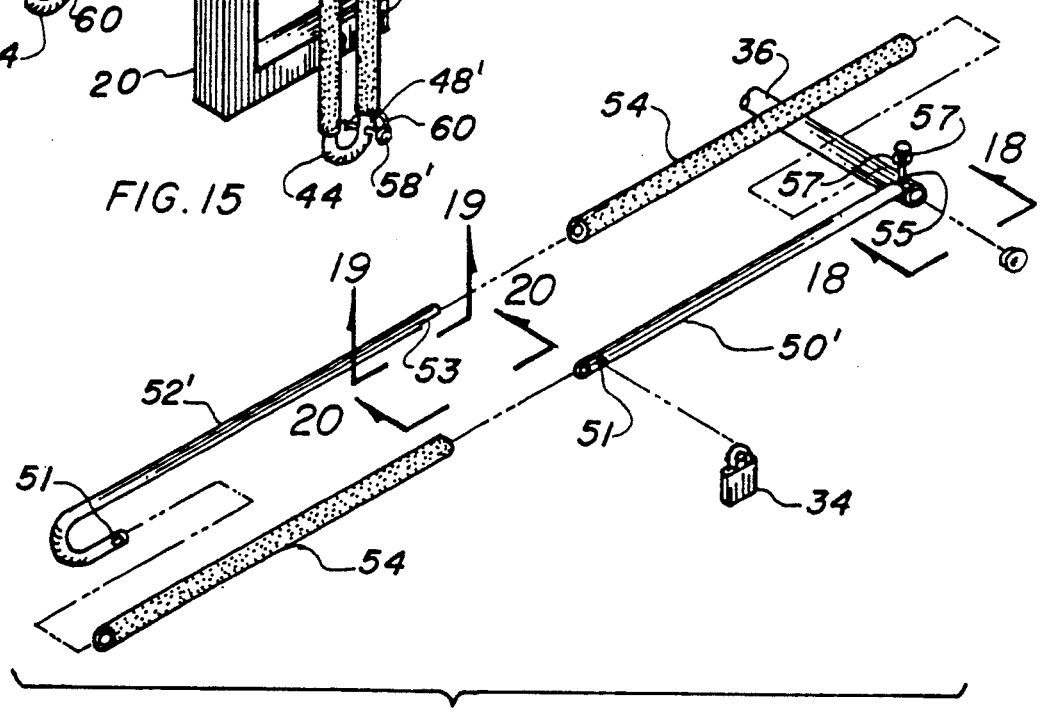
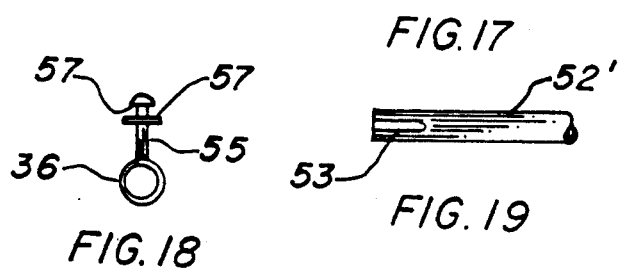

BICYCLE CARRYING RACK

TECHNICAL FIELD

The present invention relates to bicycle carrying racks for motor vehicles in general, and more specifically to racks that fit a trailer hitch of the vehicle with arms that rotate downward out of the way when not in use.

BACKGROUND ART

Previously, many types of racks have been in common use to carry bicycles on cars, vans and station wagons. In the past attachment to the vehicle has been limited to direct connection or clamping to the frame or bumper, or in other instances, strapped to the vehicle using suction cups, roof carriers, and the like.

A search of the prior art did not disclose any patents that read directly on the claims of the instant invention, however, the following U.S. patents were considered related:

| Patent No. | Inventor | Filing Date |
| --- | --- | --- |
| DES 298,746 | Witworth et al | Oct. 31, 1986 |
| DES 295,030 | Wahl | Apr. 23, 1984 |
| 4,298,151 | O'Connor | Apr. 6, 1978 |
| 4,128,195 | Collins | Apr. 29, 1977 |
| 4,050,616 | Mosow | Sep. 19, 1975 |
| 3,921,869 | Rogers | May 6, 1974 |
| 3,877,622 | McLain | Sep. 27, 1972 |

O'Connor teaches a bicycle carrier that interfaces into holes in the bumper and a clamp attaching to the body. The bicycles rest on a diagonally girded bracket attached to a vertical frame structure with a pivoting arm locking the bicycle in place.

Collins employs a frame that is clamped onto a car bumper creating an emergency protective guard with a second frame connected thereto having vertical uprights. The vertical member is cantilevered outward and contains recesses for holding cicyle frames.

Mosow, again, attaches his rack to the bumper of an automobile, however, his frame telescopes vertically for height adjustment to accommodate a particular bicycle mounted on a given vehicle. Attachment of the bicycle is by a pair of cantilevered arms.

Rogers, on the other hand, teaches a bicycle carrying rack for mounting on an automobile that supports the bicycle by their handle bars and seats in a vertical position.

McLain approaches the problem of carrying a bicycle on a motor vehicle by clamping a pair of vertical members to the bumper and utilizing a channel top plate formed as an open channel and a pair of arms locked into the plate. The arms hold the bicycle and fold out of the way when not in use.

For background purposes and as indicative of the art to which the invention relates reference may be made to the remaining cited patents issued to Wall and Witworth et al.

DISCLOSURE OF THE INVENTION

The need for transporting bicycles on motor vehicles has been with us for many years particularly now when the bicycle is used for recreational purposes and not basically for transportation. Many riders living in large cities transport their bicycles to a safer and more convenient area for use and, as such, require a method of attachment of the bicycle to the vehicle, as it is inherently too large to fit inside.

It is a primary object of the invention to not only fill the need for a basic carrier but to improve upon its utility by employing an apparatus for attachment that already exists on the motor vehicle and is much stronger than the bumper itself. Many automobiles, vans, and station wagons are equipped with a standard bumper hitch for towing trailers, and it is to these vehicles that this invention is directed. Government standards have been established to make the size and strength of these hitches uniform. A classification has been established typically class 1, 2, and 3 for conventional vehicles. The invention covers these classifications in two embodiments and utilizes the inherent strength and size limitations by attaching directly to the top of a class 1 and 2 through the hole for the ball hitch and directly into the square socket of the box hitch in the class 3 configuration.

An important object of the invention, along with the inherent strength and convenience of location is the ability of the rack to rotate the bicycle mounting arms downward out of the way when not in use. This unique feature allows the vehicle to park normally as no projection is made beyond an ordinary trailer hitch and improves the asthetic appearance of the vehicle.

Another object of the invention is its basic simplicity in operation as only one part is attached to the trailer hitch with a single large ⅜-10 hexagon nut for class 1 and 2 hitches and only a retaining pin in the class 3 embodiment.

Still another object of the invention allows the rack to be locked to the vehicle using conveniently available ordinary padlocks. Two or three locks are required, one to secure the rack to the vehicle and one or two to secure the attaching arms to the rack. Normally, the padlocks may be procured keyed alike requiring only one key to be carried by the user. Since todays bicycles that are used for recreation are very expensive, this ease of locking is surely needed.

Yet another object of the invention is the ability of the rack to store any type of bicycle having a frame that fits between the arms, from racing bikes, touring bikes, mountain bikes, girls bikes, and almost any size from full to childrens size with no adjustment or modification necessary.

A final object of the invention is its rugged yet simple design that allows the carrier to be cost effective and hence available to the majority of the public.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment with the arms shown rotated downward and the motor vehicle illustrated in dashed lines.

FIG. 2 is a partial isometric view of the preferred embodiment shown removed from a vehicle as in FIG. 1.

FIG. 3 is a partial isometric view of the preferred embodiment with the arms rotated horizontally, as when in use in attaching to bicycles.

FIG. 4 is a cross-section view taken along lines 4—4 of FIG. 3 illustrating the interface of one of the U-shaped arms.

FIG. 5 is a cross-sectional view taken along lines 5—5 of FIG. 3 depicting the joint between the mounting leg and the horizontal beam with the leg retaining means having a pin with a padlock.

FIG. 6 is a cross-sectional view taken along lines 6—6 of FIG. 2 as in FIG. 5, except the pin has a spring clip on one end in place of the padlock.

FIG. 7 is a rear elevational view of the preferred embodiment, as it would be installed on a motor vehicle with a bicycle mounted in place. For clarity, the bicycle is shown in dashed lines.

FIG. 8 is an exploded view of the preferred embodiment with padlocks for locking the bicycle and rack in place.

FIG. 9 is a cut-away view of the second embodiment vertical column with the threaded stud disposed from the bottom.

FIG. 10 is a partial exploded view in isometric of the second embodiment vertical column, as it is mounted into a class 1 or 2 trailer hitch with a padlock for securing the nut on the stud.

FIG. 11 is a partial isometric of the preferred embodiment horizontal member mounted into a class 3 trailer hitch with a padlock securing the leg retaining means.

FIG. 12 is a partial isometric of the preferred embodiment horizontal member mounted into a class 3 trailer hitch with a spring clip pin securing the leg retaining means.

FIG. 13 is a fragmentary view of one of the U-shaped arms with padlock arm retaining means.

FIG. 14 is a fragmentary view as in FIG. 13, except a spring clip for the retaining means.

FIG. 15 is a partial isometric drawing of the preferred embodiment with a variation of the U-shaped arms, shown removed from the vehicle for clarity.

FIG. 16 is a partial isometric drawing of the preferred embodiment as described above, except the arms are rotated horizontally.

FIG. 17 is an exploded view of the variation of the U-shaped arms.

FIG. 18 is a cross-sectional view taken along lines 18—18 of FIG. 17.

FIG. 19 is a cross-sectional view taken along lines 19—19 of FIG. 17.

FIG. 20 is a cross-sectional view taken along lines 20—20 of FIG. 17 rotated 90 degrees for clarity.

BEST MODE FOR CARRYING OUT THE INVENTION

The best mode for carrying out the invention is presented in terms of a preferred and a second embodiment. Both embodiments are primarily designed alike with the exception of the retaining means for attaching to the vehicle.

The preferred embodiment, as shown in FIGS. 1 through 5, 7 through 11 and 13 are comprised of an "L" shaped mounting leg 20 consisting of a vertical column 22 and a horizontal member 24, best depicted in FIGS. 2, 3 and 8. The leg 20 is made of metallic rectangular tube with seamed steel tube being preferred. A hole 26 is located through the vertical column 22 near the end and the horizontal member 24 is of a size and shape to fit inside a class 3 trailer box hitch. A thermoplastic square cap 28 is positioned over the exposed end of the column for enclosing the hollow member. The leg 20 has the column 22 and horizontal member 24 attached together by welding using a mitered joint.

The horizontal member 24 further contains bores 30, preferably two, that line up with a hole in the trailer box hitch, two holes allow for some depth adjustment in the specific application. Leg retaining means in the form of a trailer hitch pull pin 32 is used to hold the leg 20 into the hitch. This pin 32 is well known in the art and consists normally of a pin with a head on one end and a snap spring lock that fits over the other end. A ring handle may also be substituted with a padlock 34 added through a hole in the end of the pin 32 for locking capabilities. Either configuration is acceptable for functional purposes.

A rotatable horizontal beam 36 preferably made of pipe or hollow tubing is disposed within the hole 26 in the column 22 of the leg 20. The beam 36 is located with each end extended an equal distance from the interface, thus creating a horizontal structural support. The hole 26 is slightly larger than the beam 36 permitting the beam to rotate within. A pair of apertures 38 located in the center of the beam, positioned at 180 degrees from each other, allowing securement of the two mating elements. A round thermoplastic cap 40 is pressed into each end of the beam 36 to seal the hollow pipe. The beam 36 is secured to the leg 20 with a removable beam attaching pin 42 that interfaces through both the horizontal beam 36 and the mounting leg column 22 such that the beam may be rotated 90 degrees. The pin 42 also has a round head on one end and a slightly chambered portion on the other end. A spring clip attached to the head holds the pin 42 in place and is configured to be installed around square tubing. Again, this pin is well known in the art and is used in the trailer industry extensively.

A pair of U-shaped arms 44 are removably attached to the beam 36, as shown in FIGS. 2 and 3. Each arm 44 forms an adjacent parallel retainer for holding the frame of a bicycle 46 with FIG. 7 illustrating this relationship. The arms 44 are formed with a removable slip joint 48 adjacent to the U-bend with a straight section 50 permanently attached to the beam 36 by welding, or the like. The straight section 50 actually retains the bicycle 46 as the frame rests between both rigid sections, as illustrated in FIG. 7. The removable section 52 is in a J-configuration and interfaces with the slip joint 48 on one end and penetrates the beam 36 on the other. This attachment connects both ends to rigid members and allows the U-shape, to be completed, securing the bicycle frame inbetween. A variation of the U-shaped arms 44 is illustrated in FIGS. 15 through 20 and is basically the same as previously described, except the outermost member is the straight section 50[1] and is welded to the horizontal beam 36. A mounting hole 51 is located in both the straight section 50[1] and the removable section 52[1] through which a padlock 34 or an arm retaining pin 58[1] may be attached. The U-shaped arms 44' are is basically the same as previously described. The removable section 52[1], however, contains a slot 53 in one end that interfaces with a vertical post 55 attached to the beam 36. The post 55 further contains a pair of engaging surfaces 57 consisting of a washer-like ring on the bottom and a round or oval shaped head on the top with the slot 53 sliding on the post with the remainder of the material engaging the surfaces of the post. In use this variation functions the same as the preferred embodiment, except the removable section is above the bicycle frame and the lock, or pin, is in the slip joint instead of blocking removal, of the arm 44 from the beam 36. The slip joint 48' is comprised of a female socket in the straight section 50 with the tube size inside diameter larger than the outside diameter of the removable section 52, or the same size tube with the exposed end swaged larger to receive the mating part. The joint 48', in any event, overlaps where two pipes intersect and the inside section penetrates a sufficient distance that a structural relationship is created providing a rigid strong joint that is easily dissembled.

In order to protect the bicycle frame 46, round cylindrical shaped resilient foam cushions 54 may be added. These cushions 54 are again well known in the art and are composed of a closed cell polyurethane foam, or any type of resilient thermoplastic, either open or closed cell. The cushion 54 is soft enough to protect the bicycle frame from abrasions or scratches when mounting the bicycle on the rack and it helps separation between bicycles when mounting more than one bicycle. The cushion 54 completely eliminates the problem of vibrating together when subjected to over-the-road transportation, as found in the motor vehicle environment.

The removable section 52 of the arm 44, while penetrating the beam 36, protrudes beyond the far wall of the beam. An orifice 56 is located in this protruding section allowing arm retaining means in the form of a pin 58 to be positioned in the orifice locking the arm 44 in place. The arm retaining pin 58 consists of a shank with a head on one end and a spring clip 60, not unlike the beam attaching pin 42. An alternate method utilizes a padlock 34 for securement with the hasp disposed within a hole in the end of the pin 58 or in the orifice 56 itself, as depicted in FIG. 3. It will be noted that either a spring clip may be used on either the trailer hitch pull pin 32 or the arm retaining pin 58, and both are shown in the drawings. As an example FIGS. 2, 6, 12 and 14 illustrate spring clips and FIGS. 3, 5, 8, 10, 11 and 13 depict the use of a padlock. The option may be made by the user, as each will function perfectly well in the invention according to the use and degree of security required.

In operation, the rack is installed onto the vehicle by sliding the mounting leg horizontal member 24 into the trailer hitch draw bar. The pull pin 32 is then inserted through the bar and aligned bore 30 in the member 24 and locked with the spring clip or padlock 34. If the arms 44 are already in the horizontal position, the removable sections 52 are dissembled from the beam 36 and the bicycles 46 are mounted in place over the straight section 50 of the arm 44. The removable section 52 is then replaced enclosing the bicycle frame and the arm retaining pins 58 are replaced and secured with either the spring clips 60 or padlocks 34. Removal of the bicycles is by a simple reversed procedure. When the rack is not in use for carrying bicycles, the arms 44 may be rotated downward to a vertical position out of the way by removing the beam attaching pin 42 and repositioning the pin to the opposite aperture 38.

The second embodiment is identical to the first, except in the method of mounting onto the trailer hitch. FIGS. 9 and 10 depict the differences which consist of omitting the horizontal member 24 of the mounting leg 20 and replacing the L-shaped leg with a straight vertical column 62 having a bottom plate 64 and a threaded stud 66 disposed from its lowermost side. This embodiment may be connected to a class 1 or class 2 trailer hitch 68 with the stud 66 penetrating through the hole 70 in the hitch normally used to fasten a ball. The stud 66 is retained by means consisting of a nut 72 and a cotter pin 74 or padlock 34, both illustrated in FIG. 10. The pin 74 or padlock 34 may be used interchangeably as either utilizes a cavity-like hole 76 in the stud 66 for interface with the nut 72 as the fastening device in any case. The difference in this type of mounting is the utilization of the flat trailer hitch 68 common to class 1 and 2 hitches. A wrench is required to install and remove the rack, however, this is common procedure as it is used universally for attaching the ball.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

I claim:

1. A rack for carrying bicycles on the rear of a motor vehicle equipped with a trailer hitch comprising:
   (a) an "L" shaped mounting leg having a vertical column and a horizontal member, said column having a first hole therethrough near an uppermost portion at right angles to the horizontal member and said mounting leg horizontal member configured such that it may be slid inside a class 3 trailer box hitch;
   (b) leg retaining means fastened to the mounting leg into said trailer box hitch;
   (c) a rotatable horizontal beam disposed within said first hole in the vertical column creating a horizontal structure support, said beam having terminal ends protruding an equal distance from each side of the mounting leg column;
   (d) said column having a second hole therethrough horizontally aligned with said first hole and extending parallel to said horizontal member, said beam having a plurality of bore holes therethrough located centrally thereof and extending at right angles to each other, said bore holes being alignable respectively with said second hole, a removable beam attaching pin interfaced through both the second hole and the respective one of said bore holes in said horizontal beam and mounting leg column such that the beam may be rotated 90;
   (e) a pair of U-shaped arms each having a first leg portion and a second leg portion connected to the first leg portion by a U-portion, a first end of said first leg portion removably fixed near a terminal end of the rotatable beam and a first end of the second leg portion fixed with respect to said beam at a location adjacent said first end of said first leg portion, each arm forming a retainer for holding bicycle frames between said leg portions, said arms further having a removable slip joint between the U-portion and the second leg portion allowing each second leg portion to receive a bicycle frame thereon, the first leg portion along with the U-portion being removably secured to the beam, thereby securing a bicycle frame to each arm; and
   (f) arm retaining means interfacing between the arms and beam to fasten the arms to the beam whereby the arms can be rotated from a substantially horizontal position when being used to a substantially vertical position when not in use.

2. The rack as recited in claim 1 wherein said mounting leg further comprises a metallic hollow square tube.

3. The rack as recited in claim 1 wherein said leg retaining means further comprise a pin having a spring clip on one end and a head on the other.

4. The rack as recited in claim 1 wherein said leg retaining means further comprise a pin having a removable padlock on one end and a head on the other.

5. The rack as recited in claim 1 wherein the removable slip joint of said U-shaped arms further comprise a female socket in the second end of the arm and a straight portion in the first end allowing each arm to be separated and joined by slipping the straight portion into the socket creating a structural joint therewithin.

6. The rack as recited in claim 1 wherein the U-shaped arms further comprise said first end removably fixed near a furthermost part of the removable beam and said second end rigidly fixed nearby.

7. The rack as recited in claim 1 wherein the U-shaped arms further comprise said first end rigidly fixed near a furthermost part of the removable beam and the second end removably fixed thereabove and said second end having a slot therein also said rotatable horizontal beam having vertical posts with a pair of engaging surfaces with said second end interfacing said slot into said post engaging surfaces for removal thereof.

8. The rack as recited in claim 1 wherein the U-shaped arms further comprise a pair of resilient foam cushions surrounding each straight portion thereof forming a protective pad for the bicycles.

9. The rack as recited in claim 1 wherein said arm retaining means further comprise a pin having a spring clip on one end and a head on the other.

10. The rack as recited in claim 1 wherein said arm retaining means further comprise a pin having a removable padlock on one end and a head on the other.

11. A rack for carrying bicycles on the rear of a motor vehicle equipped with a trailer hitch comprising:
(a) a vertical column having a first hole therethrough near an uppermost portion thereof, said column further having a threaded stud disposed from a lowermost end such that the column may be connected to a class 1 or class 2 trailer hitch through a hole normally used to fasten a ball;
(b) column retaining means fastening the column to said trailer hitch;
(c) a rotatable horizontal beam disposed within said first hole in the vertical column creating a horizontal structure support, said beam having terminal ends protruding equal distances from each side of said column;
(d) said column having a second hole therethrough horizontally aligned with said first hole and extending at a right angle to said first hole, said beam having a plurality of bore holes therethrough located centrally thereof and extending at right angles to each other, said bore holes being adjustable respectively with said second hole, a removable beam attaching pin interfaced through both the second hole and a respective one of said bore holes in said horizontal beam and mounting leg column such that the beam may be rotated 90 degrees;
(e) a pair of U-shaped arms each having a first leg portion and a second leg portion connected to the first leg potion by a U-portion, a first end of said first leg portion removably fixed near one terminal end of the rotatable beam and a first end of the second leg portion fixed with respect to said beam at a location adjacent said first end of said first leg portion, each arm forming a retainer for holding bicycle frames between said leg portions, said arms further having a removable slip joint between the U-portion and the second leg portion allowing each second leg portion to receive a bicycle frame thereon, the first leg portion along with the U-portion being removably secured to the beam, thereby securing a bicycle frame to each arm; and
(f) arm retaining means interfacing between the arms and beam to fasten the arms to the beam whereby the arms can be rotated from a substantially horizontal position during use to a substantially vertical position when not in use.

12. The rack as recited in claim 11 wherein said column retaining means further comprise a nut and cotter pin for attaching to and securing the threaded stud to the trailer hitch.

13. The rack as recited in claim 11 wherein said column retaining means further comprise a nut and removable padlock for attaching to and securing the threaded stud to the trailer hitch.

* * * * *